United States Patent [19]
Spitzer et al.

[11] Patent Number: 5,715,337
[45] Date of Patent: Feb. 3, 1998

[54] COMPACT DISPLAY SYSTEM

[75] Inventors: Mark Bradley Spitzer, Sharon; Joseph Jacobson, Cambridge, both of Mass.

[73] Assignee: The Mirco Optical Corporation, Boston, Mass.

[21] Appl. No.: 716,103

[22] Filed: Sep. 19, 1996

[51] Int. Cl.$^6$ .................... G02F 1/295; G02B 26/08; F21V 7/04

[52] U.S. Cl. .................... 385/4; 385/25; 385/115; 385/116; 385/119; 385/901; 359/209; 359/237; 359/298; 363/32

[58] Field of Search .................. 385/1, 2, 3, 4, 385/8, 15, 16, 25, 31, 88, 89, 115, 116, 119, 901; 359/209, 630, 298, 242, 277, 239, 237; 362/32; 40/547

[56] References Cited

U.S. PATENT DOCUMENTS

| | | | |
|---|---|---|---|
| 3,470,320 | 9/1969 | Pike et al. | 178/7.6 X |
| 3,892,468 | 7/1975 | Duguay | 385/4 X |
| 4,311,999 | 1/1982 | Upton et al. | 340/755 |
| 4,385,798 | 5/1983 | Yevick | 385/4 X |
| 4,747,648 | 5/1988 | Gilliland, III | 385/901 X |
| 4,831,370 | 5/1989 | Smoot | 340/755 |
| 5,136,675 | 8/1992 | Hodson | 385/116 |
| 5,159,656 | 10/1992 | Goldstein | 385/116 |
| 5,281,960 | 1/1994 | Dwyer, III | 345/31 |
| 5,315,423 | 5/1994 | Hong | 359/124 |
| 5,316,490 | 5/1994 | Ansley | 359/209 |
| 5,317,148 | 5/1994 | Gray et al. | 250/227.26 |
| 5,348,477 | 9/1994 | Welch et al. | 434/43 |
| 5,416,876 | 5/1995 | Ansley et al. | 385/116 |
| 5,485,225 | 1/1996 | Deter et al. | 348/804 |
| 5,613,022 | 3/1997 | Odhner et al. | 385/37 |
| 5,621,829 | 4/1997 | Ford | 385/22 |

OTHER PUBLICATIONS

Upton et al., "Eyeglass Heads-up Display", Proceedings of the SID, vol. 23,2, 1982, pp. 77-80.

*Primary Examiner*—Brian Healy
*Attorney, Agent, or Firm*—Iandiorio & Teska

[57] ABSTRACT

A compact display system including a viewing surface; a beam steering mechanism; a source of light remote from the viewing surface and the beam steering mechanism; and at least one waveguide connecting the source of light with the viewing surface for transmitting illumination from the source of light to the viewing surface. The beam steering mechanism is associated with the waveguide and the viewing surface for scanning illumination transmitted by the waveguide onto the viewing surface. There is a modulator for modulating the source of light; and a subsystem for synchronizing the modulator with the beam steering mechanism, but only the distal end of the waveguide and the beam steering mechanism are located near the viewing surface resulting in a more compact display which can be mounted on a pair of eyeglasses.

37 Claims, 11 Drawing Sheets

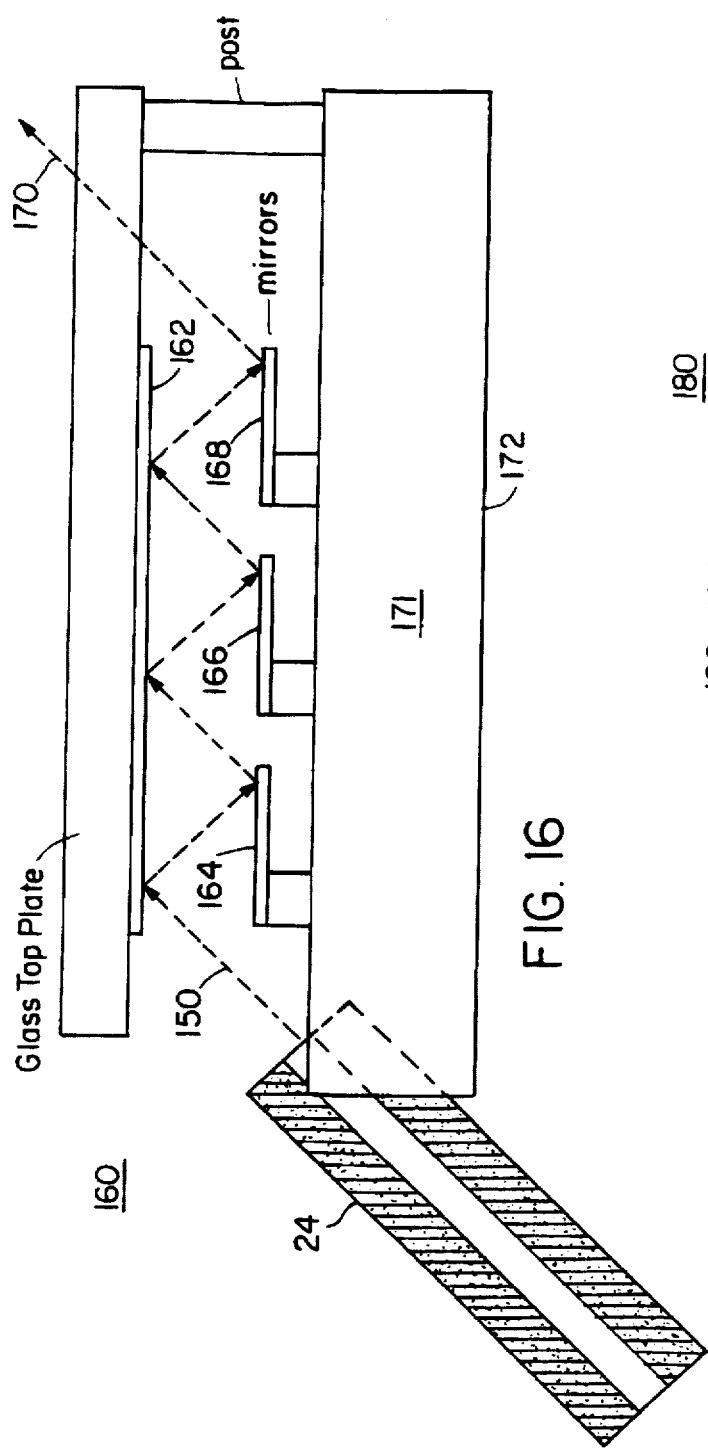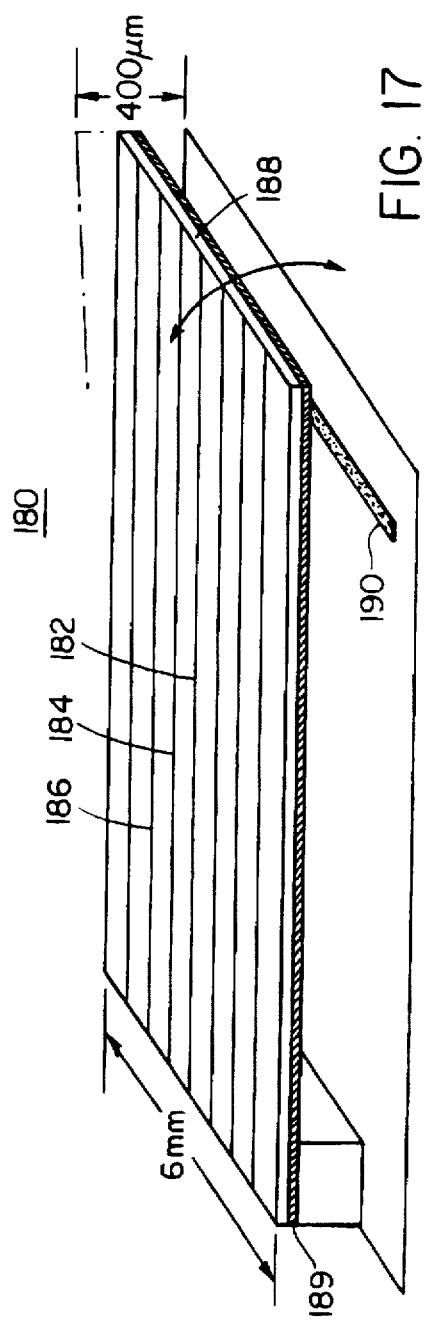

COMPACT DISPLAY SYSTEM

FIELD OF INVENTION

This invention relates to miniature displays such as head mounted or hand held displays. More particularly, this invention relates to display systems formed using a compact optical signal propagation and processing system particularly suited to low power, compact image transmission by optical fiber, and efficient image reconstruction.

BACKGROUND OF INVENTION

Head mounted image displays (e.g. helmets, goggles, and eyeglasses incorporating miniature displays) and other remote, compact display systems which provide data in alphanumeric, graphic, or video form have applications in avionics, medicine, and entertainment, as well as numerous other applications. See, e.g. U.S. Pat. Nos. 5,348,477; 5,281,960; 4,806,011 and 5,162,828. For example, such systems enable aircraft pilots to view aircraft instrumentation while also maintaining visual contact and awareness of conditions surrounding the aircraft. Such systems have other applications as well, such as speech interpretation devices. See, e.g. U.S. Pat. No. 4,311,999.

Most prior art head mounted displays operate by transmitting an electronic digital or analog signal representing the image to the head mounted display. Electronic circuits near or within the display, in combination with electro-optic means within the display, convert the electronic signals to an optical image for viewing on an image plane. For example, cathode ray tubes utilize synchronized electronic analog signals to modulate the intensity of a raster scanned electron beam which in turn excites an electro-optic effect in phosphor, thus producing an optical image. A second example is a liquid crystal display, in which an electronic signal is used to modulate the alignment of electro-optic liquid crystals, thereby converting the electrical signals to an optical image.

The principal limitations of the prior art electronic displays are that the electronic circuitry and electro-optics required to convert the electronic signals to an optical image are bulky, add weight to the display system, consume power, and dissipate heat. These factors are particularly limiting in high resolution head mounted displays that are incorporated as part of the frame of eyeglasses. For example, U.S. Pat. No. 4,806,011 shows a simple display comprising as an example a clock, mounted within spectacles. If each digit comprises a seven-segment numerical display, the clock display requires only 28 pixels, which is especially low in resolution. If the number of pixels is increased to the level needed for a computer display, such as is used for present-day color video graphics array (VGA), 640×480×3 (or 921,600) pixels are required. The electronic circuitry to support a high resolution display is more complex and accordingly is more difficult to incorporate within eyeglasses. This difficulty becomes more limiting as one considers the more advanced displays that comprise many millions of pixels. For example, a 1280×1024 display with 8 bits of greyscale per color operating at 60 Hz frame refresh rate requires 236 megabytes of data per second. High speed electronic circuitry to support this capability dissipates heat, radiates electromagnetic interference (which may require shielding thus adding volume and weight), and cannot easily be integrated within glasses, even by using integrated circuit technology. It is not only the electronic circuits that generate heat in this type of prior art head mounted display, but also the light-generating electro-optics, which are usually inefficient. Electroluminescent, light emitting diode, and field emission devices all generate heat. Although liquid crystal displays do not generate heat, such displays utilize a light source behind the display which also generates heat. In applications in which these displays are mounted near the body and particularly the head, heat generation requires shields, heat sinks and the like to conduct the heat away from the body, thus increasing weight and volume. Thus, such displays are difficult to integrate in a highly compact system.

A second type of prior art head mounted display includes the use of a coherent fiber bundle to relay the image from a remote display such as a CRT to the desired image plane location (see for example U.S. Pat. No. 5,348,477). Such displays do not use signals for the transmission of the image. Rather, the image is preserved by the coherent fiber bundle, which relays photons from the CRT (or other display) image plane to the remote image plane near the user's eyes. This approach is thus entirely different and much simpler than approaches employing signal transmission to the head mounted system. A variation of this type of prior art display is described in U.S. Pat. No. 5,281,960, in which the position of the coherent fiber bundle is dithered to effect an enhanced resolution. The principal of operation of the relay of an image plane, however, is the same as the more simple non-dithered version. These displays also have the limitation that the coherent fiber bundle is not very compact. Additionally, in medium to high resolution systems, the coherent fiber bundle has the additional limitation of inflexibility. A further limitation is the volume required for the bundle: typically, the coherent bundle requires an image plane of approximately the same size at the exit as at the entrance; this size may be reduced somewhat by tapering but nevertheless, the bundle itself occupies a large amount of volume behind the image plane which limits the degree of miniaturization that can be attained with such an approach. For example, for an image plane of one square inch, the fiber bundle will require as a minimum approximately one cubic inch behind the image plane. Also, the bundle is primarily glass thus adding a reasonably high weight to the head mounted system. Although as compared to miniature electronic displays such an approach reduces the power dissipation near the head, the volume and weight of the coherent fiber bundle make the attainment of a compact system difficult in eyeglasses applications.

U.S. Pat. Nos. 3,112,300 and 3,470,320 disclose a source of light and a short light pipe which transmits light a short distance, from the light pipe's stationary end to the opposite end which is free to move. Light is emitted from this movable end. The moving end of the pipe is vibrated horizontally and vertically by an electromagnetic scanner to move the end of the light pipe across a two dimensional area. The moving end of the pipe may thus serve as a moving light source for the construction of an image, if the light source is properly modulated. For a compact display application, this approach has a number of limitations. First is the large voltage needed to deflect the light pipe (on the order of 50 kV, as disclosed in U.S. Pat. No. 3,112,300). The second disadvantage is the heat dissipation which occurs by mounting a lamp adjacent to the light pipe. Third, the light source must be modulated, thus electrical signals must be provided to the lamp in the manner of the prior art displays discussed above, with all of the limitations previously described.

A vibratory scan optical display is shown in U.S. Pat. No. 4,311,999 which uses a linear row of optical fibers which is vibrated vertically by an electromagnetic vibrator. The ends of the fibers form a line in the viewing surface, and the vertical vibration scans the line to form a two dimensional image. In this system, however, the LEDs at the other end of the fibers are mounted with the display on the eyeglasses which, as explained above, generate heat and add weight. An additional limitation of such a device is that the distance between pixels is fixed by the outside dimensions of the fiber. A further limitation of this device is that detectors or position sensors cannot be integrated within the optical fiber device, so that the volume required for the parts cannot be reduced. An improved vibratory scan optical display is shown in U.S. Pat. No. 5,416,876 which extends the linear row of optical fibers shown in U.S. Pat. No. 4,311,999 into a fiber optic cable so that the light source can be mounted remotely. This approach removes heat dissipation at the head, and reduces weight upon the head, but does not address the limitation inherent in the use of optical fiber of fixed dimensions, and does not address the need for a highly compact system. For example, U.S. Pat. No. 5,416,876 (FIG. 3) shows the need for a discrete photodetector used for scan synchronization which must be mounted outside the display area. The use of image conduits as shown in U.S. Pat. No. 5,348,477 and/or linear fiber optical cables as shown in U.S. Pat. No. 5,416,876 have the further limitation that the optical output of the fibers, whether in the form of a single pixel, a row of pixels, or a complete image (rows and columns of pixels) cannot be further processed on the head, as for example to adjust or modify the image, without reconversion to electrical form. This is a particular limitation of resonant scanning systems which must scan at the mechanical resonant frequency dictated by the mechanical design of the system, as explained in U.S. Pat. No. 5,348,477.

The above prior art displays address mainly axial optical systems, in which the image is viewed using conventional paraxial imaging optics. The creation of a highly compact head mounted display such as a display mounted within eyeglasses requires nonaxial optical designs. An additional limiting factor not anticipated by the foregoing prior art is the introduction of keystone and other distortions that occur in nonaxial optical designs. These distortions must be compensated by use of special optical elements which add weight, or preferably by processing of the image in signal form to pre-compensate the image.

A further limitation of the prior art is the absence of safety features that protect the eyes of the users from possible failures of the displays.

SUMMARY OF INVENTION

It is therefore an object of this invention to provide a more compact display system.

It is a further object of this invention to provide such a compact display system which can be used in conjunction with a head mounted display.

It is a further object of this invention to provide such a compact display system which can be used in conjunction with a hand held display.

It is a further object of this invention to provide such a compact display system which does not require high speed signal processing electronic circuitry or electro-optics within the display system to convert a digital or analog signal representation of an image into the image itself.

It is a further object of this invention to provide such a compact display system, which eliminates the need for LEDs or other light-generating sources to be mounted on or close to the display.

It is a further object of this invention to provide such a compact display system which transmits light itself instead of an electrical digital or analog representation of an image to the viewing surface thus disassociating the electronic circuitry from the remote head-mounted components thereby providing a more compact, lighter, and cooler display system.

It is a further objective of this invention to provide a means for signal processing of the image to compensate for optical distortions or aberrations in the image, and to provide for safety features, and to provide other forms of signal conditioning or processing that may be useful, such as brightness control.

It is a further objective of this invention to reduce heat and weight of a head mounted display by providing a means for relocating the generation of light for illuminating a head mounted display from the display system itself mounted on the head, to an alternate location.

It is a further object of this invention to obviate the limitation in optical fiber transmission-based displays that the signal must be transmitted as a single pixel, a row of pixels, or a frame of pixels.

This invention results from the realization that a truly compact display system can be accomplished by transmitting the image in optical signal form over a long flexible fiber optic cable, and that the cable and optical processor may be designed for the most efficient, ergonomic or cost effective system. This optical signal can comprise the photons to be used for constructing the image thus obviating the need for a light source at or near the image plane. An optical signal processor is used to reconstruct the image from the signal bits; this processor uses the signal photons for illumination. In this way, the signal remains in optical form and is not converted to an electrical signal. By obviating conversions between electrical and optical signals at the remote display point (i.e. on the head), a savings in power consumption and a consequent reduction in power dissipation is realized, even though signal processing may occur. Additionally, the optical processor may be miniature thus saving considerable volume, enabling the miniaturization of the head mounted system, and the formation of a highly compact head mounted display system.

This invention features a compact display system comprising: a viewing surface; beam steering means; a source of light remote from the viewing surface and the beam steering means; and at least one waveguide connecting the source of light with the viewing surface for transmitting illumination from the source of light to the viewing surface. The beam steering means is associated with the waveguide and the viewing surface for scanning illumination transmitted by the waveguide onto the viewing surface. There is a modulator for modulating the source of light and means for synchronizing the modulator with the beam steering means.

In a preferred embodiment, the beam steering means is mounted on a pair of eyeglasses and connected to one end of the waveguide. The viewing surface includes the eyeglasses but the source of light and the modulator are remote from the eyeglasses. To protect the wearer's eyes, there are means for sensing the range of scanning by the beam steering means and means, responsive to the means for sensing, and responsive in the modulator, for interrupting the transmission of light to the beam steering means in response to a range of scanning beyond a predetermined threshold.

There are a number of mechanisms which may form the beam steering means. In one embodiment, the beam steering means includes a pair of reflective elements positioned to receive light from the waveguide, means for deflecting one of the reflective elements in one direction, and means for deflecting the other reflective element in a second direction. The waveguide is typically an optical fiber and the beam steering means may comprise a cantilever waveguide having a cantilever portion including the output end of the optical fiber. In one embodiment, the cantilever waveguide includes a substrate and a groove cut in the substrate to receive the optical fiber. The groove includes two portions, a first portion of a first depth to fix the position of the fiber and a second, cantilever portion of a second, greater depth in which the distal end of the fiber is free to move.

Alternatively, the cantilever waveguide includes a capacitor, one plate of which is a component of the cantilever portion and a second plate of which is spaced from the first plate one direction for deflecting the fiber in that direction. For two axis scanning, there is a second capacitor and a third plate spaced from the first plate in a second direction for deflecting the fiber in the second direction.

In another embodiment, the cantilever portion includes a layer of piezoelectric material and means for applying a potential across the piezoelectric material. Alternatively, the cantilever portion includes one of a material attracted to magnetic forces and an electromagnetic material, the other of the material attracted to magnetic forces and the electromagnetic material spaced therefrom.

The system may further include a vacuum enclosure surrounding the cantilever portion for controlling the damping of the motion of the moving parts and/or means for amplifying the displacement of the cantilever portion. The means for amplifying includes a set of reflectors displaced at an angle with respect to a path of light exciting the distal end of the waveguide.

In another embodiment, the beam steering means includes a plurality of parallel output waveguides on a deflectable cantilever pad. There are also means for switching the position of a distal end of the fiber to direct illumination alternatively among the output waveguides.

For color displays, the source of light is a source of white light and the system further includes means for resolving the white light into a plurality of colors. The means for resolving typically includes dichroic devices, one for each color and the modulator includes means for separately modulating each separate color of light. The waveguide then includes a plurality of input optical fibers each optically coupled to each means for modulating and a fiber coupler for coupling each input fiber. Finally, there is an output optical fiber connected to the coupler.

The source of light may include at least one optoelectronic device, the optical fiber is typically a single mode fiber with a core diameter in the range of approximately 1 μm to 5 μm, and the optical fiber preferably has a length greater than three feet for increasing the maneuverability of the viewing surface.

The invention also features a compact display system comprising: a viewing surface; a waveguide; beam steering means including: a pair of reflective elements positioned to receive light from the waveguide, means for deflecting one of the reflective elements in one direction, and means for deflecting the other reflective element in a second direction; and a source of light remote from the viewing surface. The waveguide connects the source of light with the beam steering means for transmitting illumination from the source of light to the beam steering means; there is a modulator for modulating the source of light; and means for synchronizing the modulator with the means for deflecting.

In another embodiment, there is a viewing surface; a long, flexible optical fiber; beam steering means including a cantilever waveguide having a cantilever portion including the distal end of the optical fiber; a source of light remote from the viewing surface; a modulator for modulating the source of light; and means for synchronizing the modulator with the beam steering means. The cantilever waveguide preferably includes a substrate and a groove cut in the substrate to receive the optical fiber. The groove includes two portions, a first portion of a first depth to fix the position of the fiber and a second portion of a greater depth in which the distal end of the fiber is free to move.

DISCLOSURE OF PREFERRED EMBODIMENT

FIG. 16 is a side view of an amplifier in accordance with the subject invention;

FIG. 17 is a three dimensional schematic view of still another embodiment of the beam steering means in accordance with this invention;

Figure 1:
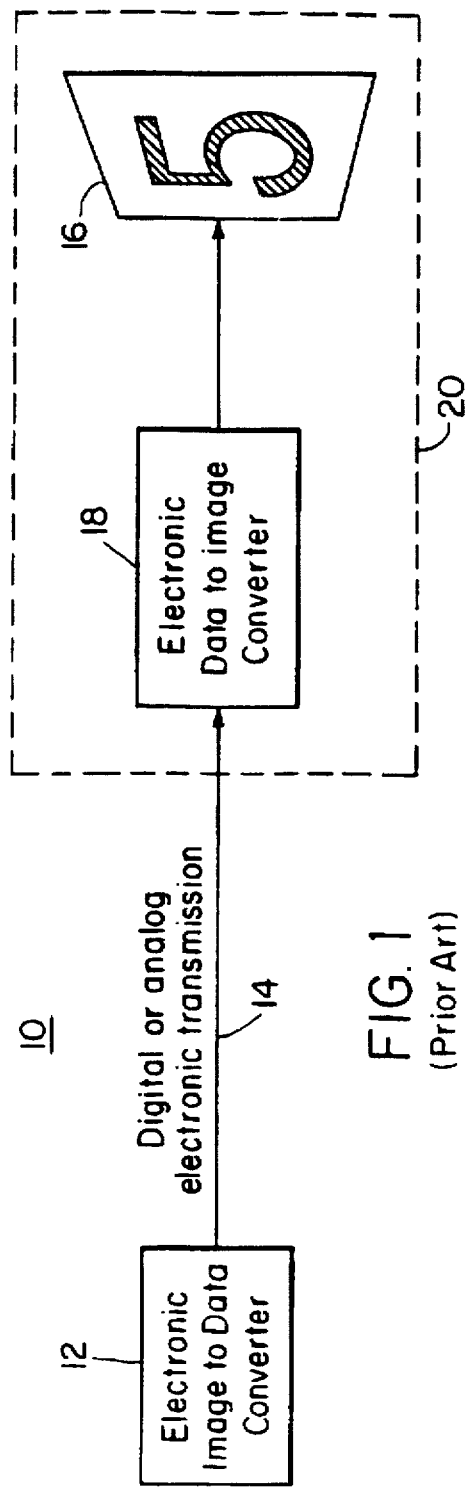
FIG. 1 is a block diagram of a prior art display system.

As discussed in Background of Invention above, prior electronic head mounted display system 10, FIG. 1 includes image to data conversion circuitry 12 in order to provide signals that transmit an image over a distance, typically from a computer remote from the body to the head-mounted display system. Such circuitry accomplishes either the direct conversion of an image to an electronic signal, as accomplished by a digital camera, or comprises electronic circuitry that recalls imagery from an electronic storage media or memory. The image may comprise alphanumeric data, symbology, artificially generated scenes, still photography, or motion pictures. The image in signal form is relayed by a transmission line or lines 14 to the vicinity of the viewer's eyes. Data-to-image converter 18, generally comprising electronic signal processing circuitry and a display, converts the digital or analog signal transmitted to the head mounted display unit 20 into an image to be viewed in the image plane 16. The circuitry 18 mounted within the head mounted display unit 20 results in a heavy, bulky, and uncomfortable head-borne load. Displays which utilize lamps or LEDs as components of the data to image converter 18 generate heat and make the head mounted display 20 uncomfortable.

Figure 2:
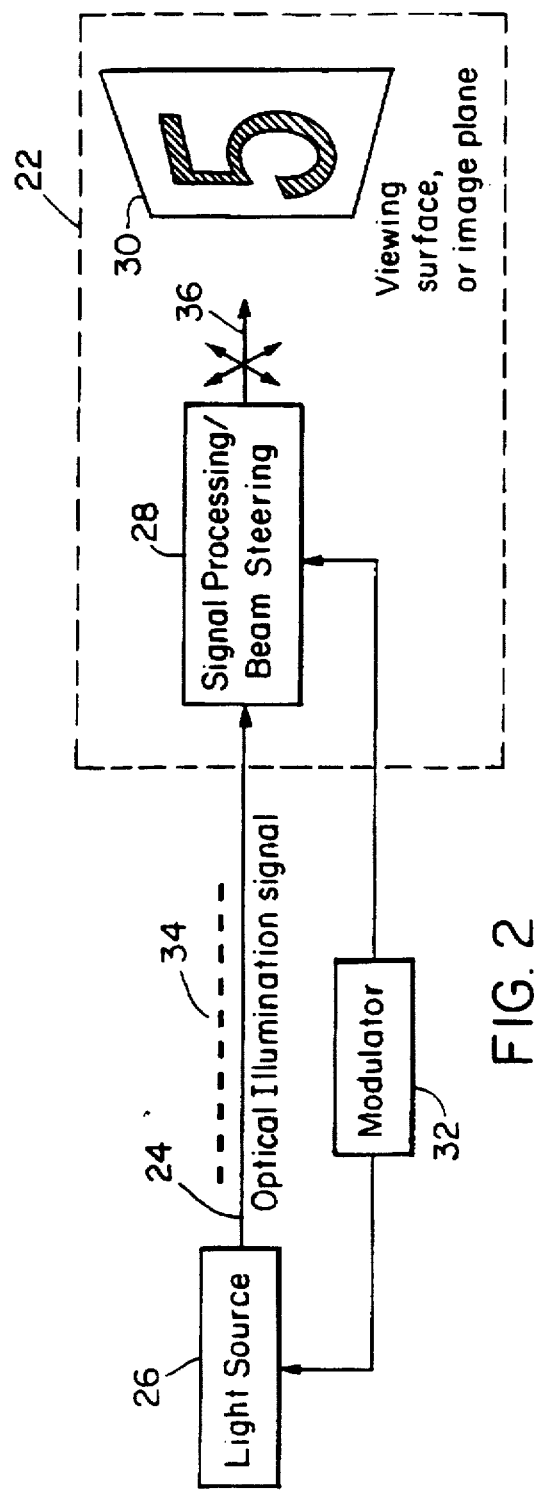
FIG. 2 is a block diagram of the compact display system of this invention.

In this invention, instead of transmitting an electronic digital or analog signal to the head mounted display 22, FIG. 2, a long, flexible fiber optic cable 24 is used to transmit optical signals 34 from light source 26. Optical processing and beam steering means 28 then create an image on image plane 30 which may be any viewing surface: free space, the lens of a pair of eyeglasses, a rear projection screen, etc. Light source 26 is under the control of modulator 32 so that it sends pulses of light as shown at 34. Optical signal processing and beam steering means 28 are also operated under the control of modulator 32 so that light rays 36, exiting beam steering means 28 are deflected in synchronization with the modulation of light from light source 26.

Note that the only portion of the system which is mounted on head mounted display 22 is the exit end of fiber optic cable 24 and optical signal processing and beam steering means 28. This design results in a more compact, lighter and non-heat generating display system. Beam steering means 28 is designed to be very compact. Additionally, by obviating electronic signal processing circuits, the invention eliminates the heat generating and bulky electronic circuitry associated with the prior art. Note also that the optical signal itself 34 may be used for illumination of the image. In this way, the need for lamps, LEDs, or other light generation devices is eliminated, thus further decreasing heat generation within the head mounted display 22.

Figure 3:
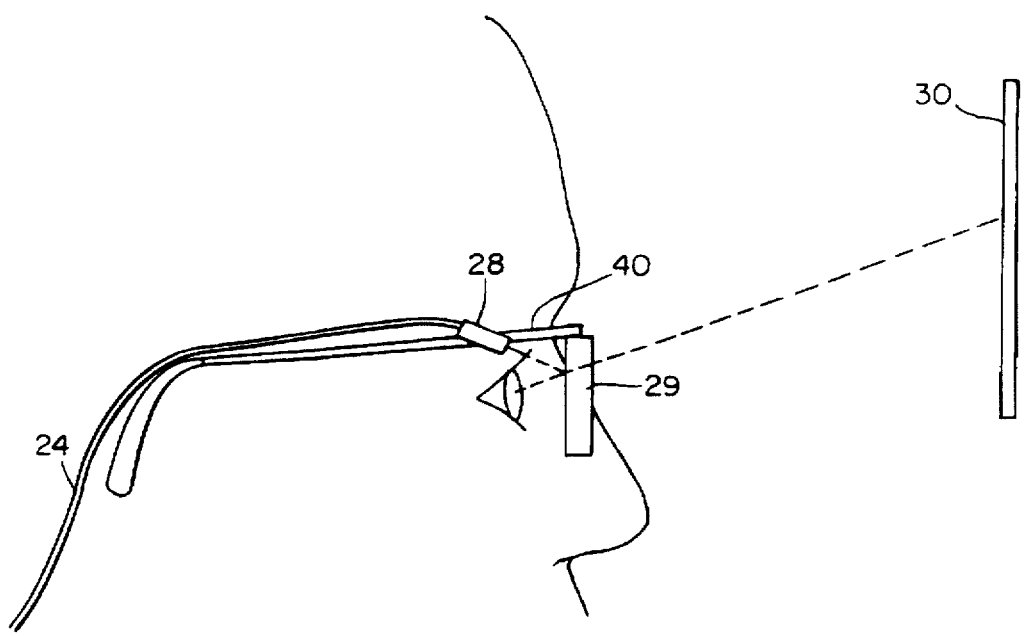
FIG. 3 is a schematic view of the compact display system shown in FIG. 2 used in conjunction with a head mounted display.

As shown in FIG. 3, compact beam steering means 28 is easily mounted to frame 40 of a pair of eyeglasses and optical fiber 24 extends therefrom. In such an embodiment, the light rays are focused and reflected by the eyeglass lens 29. The viewer perceives an image at position 30.

Figure 4:
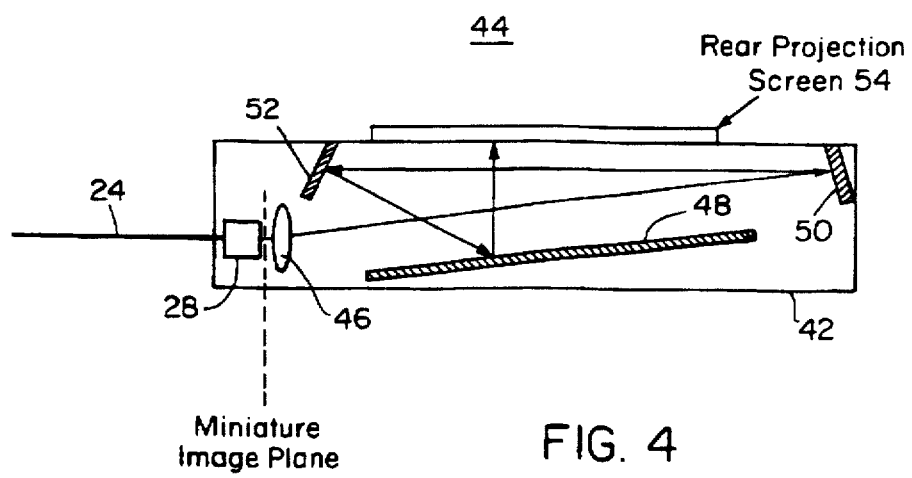
FIG. 4 is a schematic view of the compact display system shown in FIG. 2 used in conjunction with a hand held display.

Signal processing and beam steering means 28, FIG. 3 is also shown mounted within housing 42, FIG. 4, of hand held display 44 which includes lens 46 and mirrors 48, 50, and 52 for forming an image on the rear surface of projection screen 54.

Figure 5:
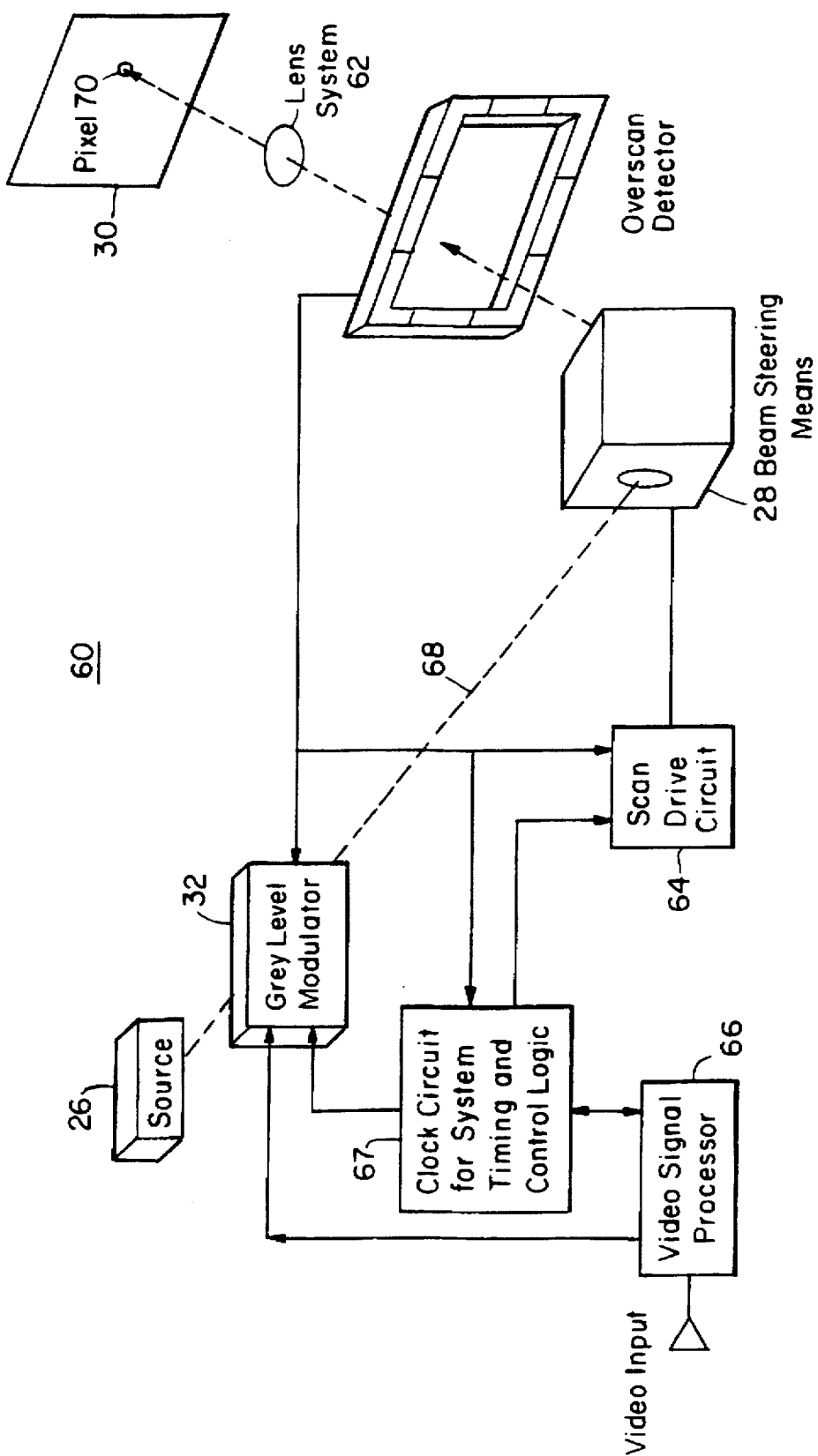
FIG. 5 is a more detailed block diagram of one embodiment of the compact display system shown in FIG. 2.

A complete display system 60 is shown in more detail in FIG. 5, including image plane 30 and lens system 62. Beam steering means 28 is responsive to light from source of light 26 and redirects the light under the control of scan drive circuit 64 for synchronizing modulator 32 with beam steering means 28. Modulator 32 modulates source of light 26 under the control of video signal processor 66 and clock and control logic circuit 68. Modulator 32 transmits varying length pulses of light to beam steering means 28 via wave guide 68 which could be a fiber optic cable a set of cables or even a set of optical devices for transmitting light in free space. Beam steering means 28 receives these pulses of light and then directs them, under the control of scan drive circuit 64 to the appropriate location at the image plane 30. Scan drive circuit 64 synchronizes modulator 32 with beam steering means 28 such that a pixel 70 is placed in the correct position on image plane 30 at the correct time in order to create an image for viewing.

Figure 6:
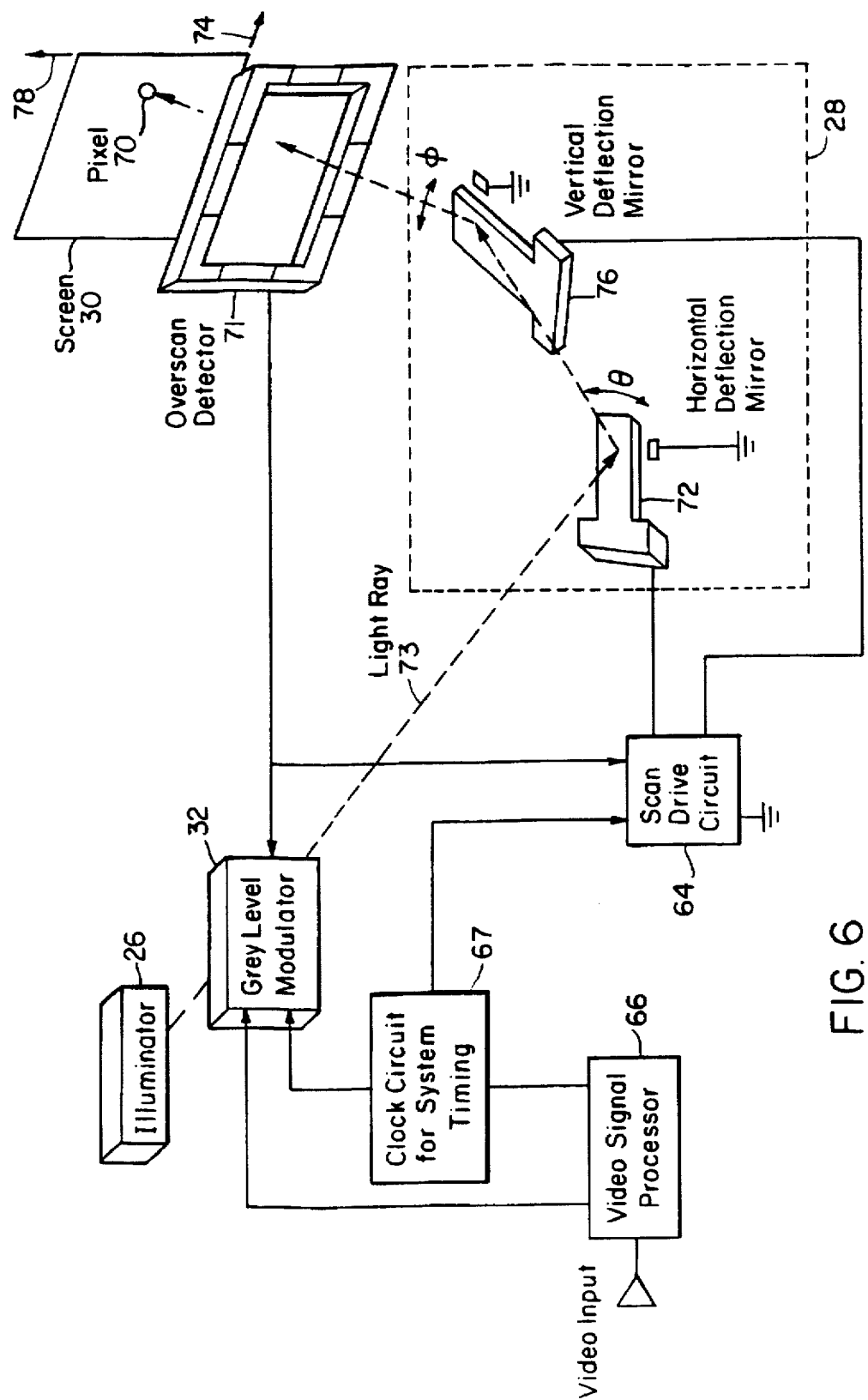
FIG. 6 is a block diagram of a compact display system in accordance with this invention incorporating horizontal and vertical deflection mirrors as the beam steering means in accordance with this invention.

In one embodiment, beam steering means 28, FIG. 6, includes horizontal deflection mirror 72 for moving pixel 70 along the horizontal axis 74 of image plane 30 and vertical deflection mirror 76 for moving pixel 70 along vertical axis 78 of image plane 30. The details of other embodiments for beam steering means 28 are discussed with reference to FIGS. 7–19 below.

A constant light flux from illuminator 26 passes through gray level modulator 32. Alternatively, the light source itself may be modulated, for example by using a semiconductor laser or light-emitting diode. The purpose of the modulator is to adjust the light flux passing to mirrors 72 and 76. The mirror angles ($\theta, \Phi$) determine the point on the plane 30 (the particular pixel 70) to which the light flux will flow, and modulator 32 adjusts the light flux for the appropriate brightness at that pixel. In order for the correct brightness to be achieved, grey level modulator 32 is synchronized with the position of mirrors 72 and 76 through the scan drive circuit 64. The modulator level is determined by reference to video signal processor 66 which receives the video input data from a computer or other source (not shown) and which then delivers a corresponding signal to modulator 32. The light from the modulator is encoded for the particular pixel and is transmitted to mirrors 72 and 76 by an optical fiber or by an equivalent free space optical method along path 73. Clock timing circuit 68 provides standard timing pulses by which all events in the scanning and modulating circuit are synchronized and controlled.

The optical signal processor includes an optical overscan detector 71 which detects when the beam has reached the start or endpoint of a scan and can be used to assist the synchronization of the scan using feedback circuits (not shown). Additionally, overscan detector 71 provides pulses to a safety override circuit (not shown) such that if the scan is not detected at the end point at the appropriate time, modulator 32 is issued a signal to interrupt the light flux. This safety feature is used to protect the user's eye in the event of a scan failure.

Video signal processor 66 receives video signals in either analog or digital form, typically but not exclusively from a computer. The signal or video input may be taken from the output of a conventional video graphics array computer circuit in the form of analog red, green, and blue voltage levels, or be standard analog formats such as RS170 and the like. Alternatively, the signals may be digital as are available at the feature connector of a VGA circuit. The function of the video signal processor is to generate frame and line synchronization pulses based on the incoming video data and supply these synchronization pulses to the clock circuit 68. Additionally, video signal processor 66 relays the video dam in analog form to the grey level modulator 32. For the case in which the video data is supplied to the video signal processor 66 in digital form, the video signal processor 66 performs digital to analog conversions, and then relays the analog data to the grey level modulator 32. In an alternative embodiment, the data is provided from the video signal processor 66 in digital form to the grey level modulator 32, and the digital to analog conversion is performed by the grey level modulator 32.

Clock circuit 68 provides synchronized system timing for all of the system functions. The clock circuit includes corrections for systematic timing delays and other adjustments that are necessary for the correct synchronization of the system. The clock circuit is formed from standard field programmable gate arrays or other programmable logic integrated circuits. Alternatively and preferably for systems manufactured in high volume, the clock circuit is formed using a custom application-specific integrated circuit (ASIC).

Grey level modulator 32 is a device that varies the transmission of a photon flux in accordance with a supplied electrical signal. There are many embodiments of such a device including Pockels and Kerr cells, as well as micro-opto-electro-mechanical devices described infra.

Scan drive circuit 64 includes function generators that provide scan signals to the optical signal processor and beam steering means 28. These drive circuits may comprise linear ramp generating integrated circuits, but preferably include programmable arbitrary-waveform circuits that can be used by the signal processor and beam steering means for distortion or aberration correction of the image.

Preferably, each embodiment of beam steering means 28, FIG. 5 operates at the speed required for high resolution two-axis imaging applications. The key factor affecting the design of a two-axis scanner is the speed at which the beam steering means operates, and the angular displacement that can be attained. For resolutions on the order of 1280×1024 at 60 Hz frame rate, the frame scan time is 17 ms. The corresponding linescan time is 15 µs. If scanning mirrors are used as shown in FIG. 6, the required horizontal scan frequency is approximately 100 kHz. Scanning waveguides may also be employed for beam deflection, as may a combination of scanning mirrors and waveguides. A frequency of 100 kHz is well above conventional micro-mirror and electro-optic beam scanner technologies. For mirror rotations of ±20° within these periods, the mirror or waveguide must scan at rates of $4 \times 10^{6\circ}/s$.

For most two-axis scanning, the required scan frequency is in the range of 50 kHz to 150 kHz, although lower frequencies can be used for commensurate lower resolution or frame rates. The subject invention comprises the use of micromachining technology to form high speed moving mirrors and waveguides, using silicon and other materials in III-V and II-VI semiconductors, many of which are available in wafer form. Additionally, this invention includes not only moving mirrors, but also moving waveguide and diffractive structures as discussed infra. For devices with high resonant frequency, this requires very low mass and a high Young's modulus.

The use of compound semiconductors (such as for example gallium arsenide) offers the following key advantages that will augment the properties of micromachined silicon: piezo-electric effect in ionic crystals, availability of many ternaries that can be grown epitaxially, and ease of integration with opto-electronic devices. The advantages of the compound semiconductors relate to the strong piezo-electric effect in some ionic materials, to the different elastic constants of III-V and II-VI materials, to the possibility of anisotropic material properties, to the wide variety of materials that can be formed using epitaxial techniques, and ultimately to the possibility of integrating light emitting or optical switching optoelectronic devices with micromachined devices.

Additionally, alternative thin-film materials are of interest for fast scanning mirrors and waveguides. For mirror fabrication, Ni is one of the materials that has received much attention. Also, the use of diamond or diamond-like films offers the possibility of forming excellent waveguide structures with unusual mechanical and optical properties. The high Young's modulus of diamond makes it particularly well suited for a high frequency scanner. A summary of the mechanical properties of these materials is provided in Table 1. Note that many of these materials have a disadvantage compared to Si: the mass is significantly higher, owing to the density of the materials.

One class of materials of significance to micro-optical waveguide devices is diamond and diamond-like material. Table 2 shows a comparison of some of the mechanical properties of Si, GaAs and diamond. Note that the high elastic constants of diamond make it suitable for ultrafast scanning micro-optical waveguides. Note also that the high index of refraction of diamond makes diamond suitable for the formation of low loss waveguides.

TABLE 1

MECHANICAL PROPERTIES OF METALS AND SEMICONDUCTORS

| Material | Thermal Coef. of Expansion at 300° K. | Density (g/cm$^3$) | Young's Modulus ($\times 10^{12}$ dynes/cm$^2$) | Poisson's Ratio | Yield Strength ($\times 10^9$ dynes/cm$^2$) | Hardness ($\times 10^{10}$ dynes/cm$^2$) |
|---|---|---|---|---|---|---|
| Is | $2.44 \times 10^{-6}$ | 2.32 | 1.7 | .358 [111] | 70 | 8.5 |
| GaAs | $6.0 \times 10^{-6}$ | 5.307 | 1.2 | 0.29 | 18.9 | 4.5 (Mohs) |
| InP | $4.5 \times 10^{-6}$ | 4.787 | 1.0 | | | |
| Ni (plated) | $17 \times 10^{-6}$ | 58.7 | 2 | | 7 | 4.5 | different combinations to attain enhanced mechanical properties that yield high resonant frequencies and fast beam steering, and that additionally permit the operation of the scanning means significantly below the mechanical resonant frequency.

The preferred embodiments of this invention include not only the use of micromachined silicon, but also the use of other materials in combination with silicon to provide a faster response time and to yield superior approaches to mirror and/or waveguide design. Preferred materials include

TABLE 2

COMPARISON OF DIAMOND, SILICON AND GALLIUM ARSENIDE

| Material | Bulk Modulus ($\times 10^{11}$ dynes cm$^2$) | Elastic Coef. ($\times 10^{11}$ dynes cm$^2$) | Shear Coef. ($\times 10^{11}$ dynes cm$^2$) |
|---|---|---|---|
| diamond | 44.2 | 95.1 | 57.7 |
| silicon | 9.9 | 10.3 | 8.0 |

TABLE 2-continued

COMPARISON OF DIAMOND, SILICON AND GALLIUM ARSENIDE

| Material | Bulk Modulus ($\times 10^{11}$ dynes cm$^2$) | Elastic Coef. ($\times 10^{11}$ dynes cm$^2$) | Shear Coef. ($\times 10^{11}$ dynes cm$^2$) |
|---|---|---|---|
| gallium arsenide | 7.7 | 6.6 | 6.0 |

The use of micromachined silicon for a cantilever beam steering device has been described by Uenishi et al. ("Micro-opto-mechanical Devices Fabricated By Anisotropic Etching of (110) Silicon," Proceedings of the IEEE Micro Electro Mechanical System Conference: An Investigation of Micro Structures, Sensors, Actuators, Machines and Robotic Systems, Osio, Japan, January 25–28, 1994 pp. 319–324). Also, Hornbeck has described so-called deformable mirror devices using thin fills of aluminum ("Deformable-Mirror Spatial Light Modulators," SPIE Critical Reviews Series Vol. 1150). An array of cantilever mirrors is disclosed by Petersen (IBM Technical Disclosure Bulletin Vol. 20, No. 1 June 1977). In a review of micromechanical technology by Petersen ("Dynamic Micromechanics on Silicon, Techniques and Devices," IEEE Trans. Electron Devices, Vol. ED-25, No. 10, Page 1241, 1978), the use of moving cantilever mirrors for display applications is described. Goto and Imanaka have described a compact beam scanning unit using a torsional spring resonator driven by a piezoelectric actuator (SPI 1544) 1544 p. 272, 1991). Recently, Smits et al. described ZnO bimorph cantilever mirrors for beam steering (SPIE Vol. 2383, page 38, 1995). Thus, it is well established in the prior art that cantilever mirrors can be used for photon beam steering. Other mirror approaches have also been considered; for example, the torsional micromirror described by Peterson (IBM J. Res. Develop. Vol. 24, No. 5, p. 631, 1980).

Cantilever waveguides have been proposed for optical switching by Watts et al. ("Electromechanical Optical Switching and Modulation in Micromachined Silicon-on-insulator Waveguides," IEEE International SOI Conference Proceedings, Vail Valley, Colo., Oct. 1–3 1991, pp. 62–63). A variation of this approach comprises the use of an oscillating fiber in a cantilever form. Such an approach was originally described by Pike in U.S. Pat. No. 3,470,320. Such beam steering means may be incorporated as shown in FIGS. 5 and 6.

Figure 7:
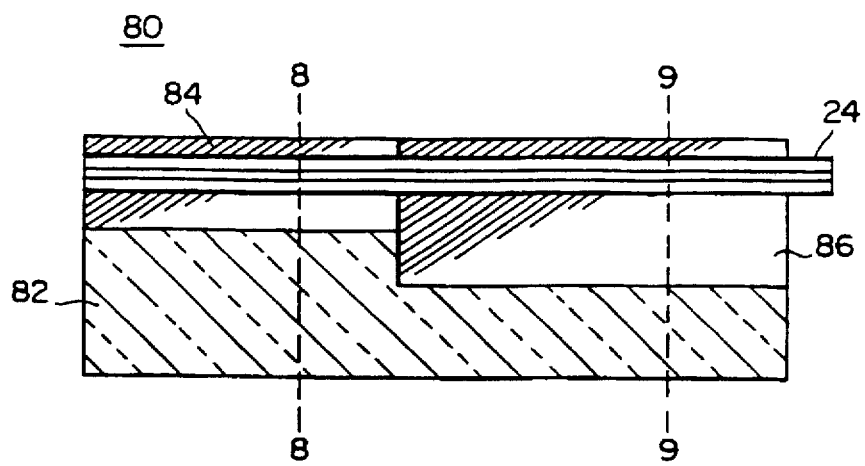
FIG. 7 is a side view of another embodiment of the beam steering means for the compact display system shown in FIG. 5.
Figure 8:
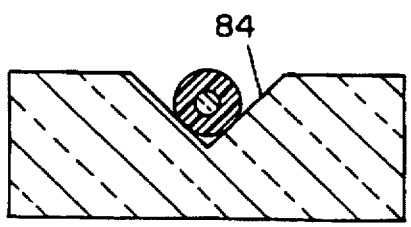
FIG. 8 is a cross-sectional view of the beam steering means shown in FIG. 7 taken along line 8—8.
Figure 9:
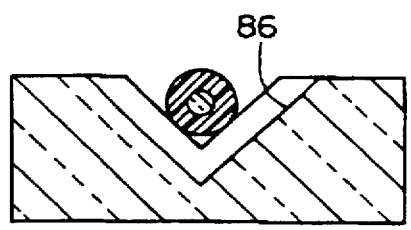
FIG. 9 is a cross-sectional view of the beam steering means shown in FIG. 7 taken along line 9—9.
Figure 10:
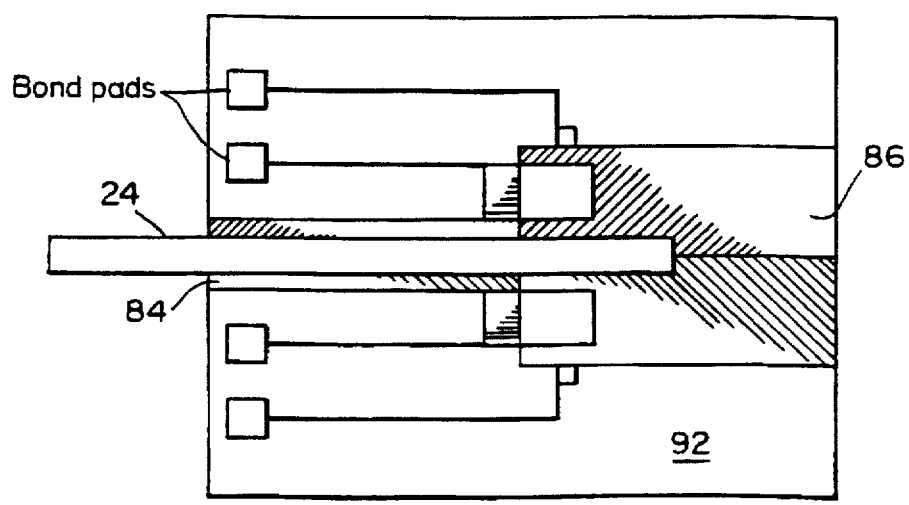
FIG. 10 is a top plan view of the bottom plate of the beam steering means shown in FIG. 7.
Figure 11:
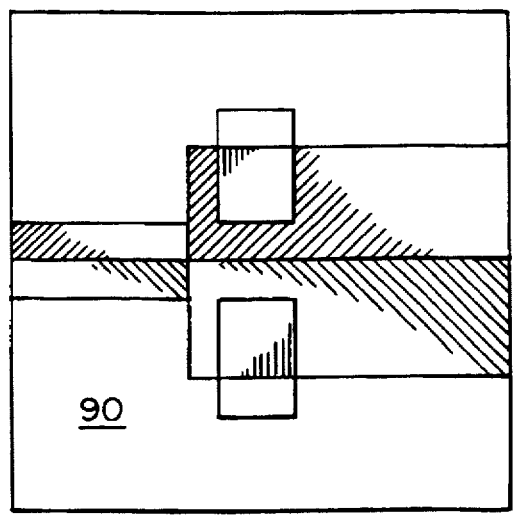
FIG. 11 is a top plan view of a top plate of the beam steering means shown in FIG. 7.

Another micromachined cantilever beam steering means 80, FIG. 7, includes optical fiber 24 bonded to silicon substrate 82. Substrate 82 includes shallow V groove in area 84 to fix the position of optical fiber 24 as shown in FIG. 8. A larger, deeper V groove in area 86 is also provided so that fiber 24 can move as shown in FIG. 9. The V grooves are formed by anisotropic etching, for example using potassium hydroxide to reveal (111) planes; these planes form the sides of the V grooves as shown by the plan view of FIG. 10. A top plate 90, FIG. 11 is provided also comprising corresponding V grooves so that when joined to bottom plate 92, FIG. 10, fiber 86 is surrounded by four electrodes that can excite resonant motion in two axis. The resonant frequency of optical fiber 24 is a function of the fiber density, length, and Young modulus. Fiber deflection is attained electrostatically. The electrostatic deflection is obtained by applying a voltage to opposite electrostatic deflection plates on the top plane 90 and the bottom plate 92. The deflection plates are formed preferably by evaporation of metals such as aluminum, copper, and any number of other conductors. The deflecting planes may also be formed from multi-layer thin film deposition techniques for application of dielectric isolation, adhesion layers and the like as is know in the art of metallization of integrated circuits. Electrical connection between the electrostatic deflection plates and an external circuit is obtained by use of the bond pads shown in FIG. 10. When assembled the electrostatic deflection plates on the top plate 90 are connected in electrical contact with the bottom plate 92. Note that the use of a top plate 90 that is shorter than the bottom plate 92 results in desirable exposure of the bond pads after joining the top plate 90 and bottom plate 92.

Figure 12:
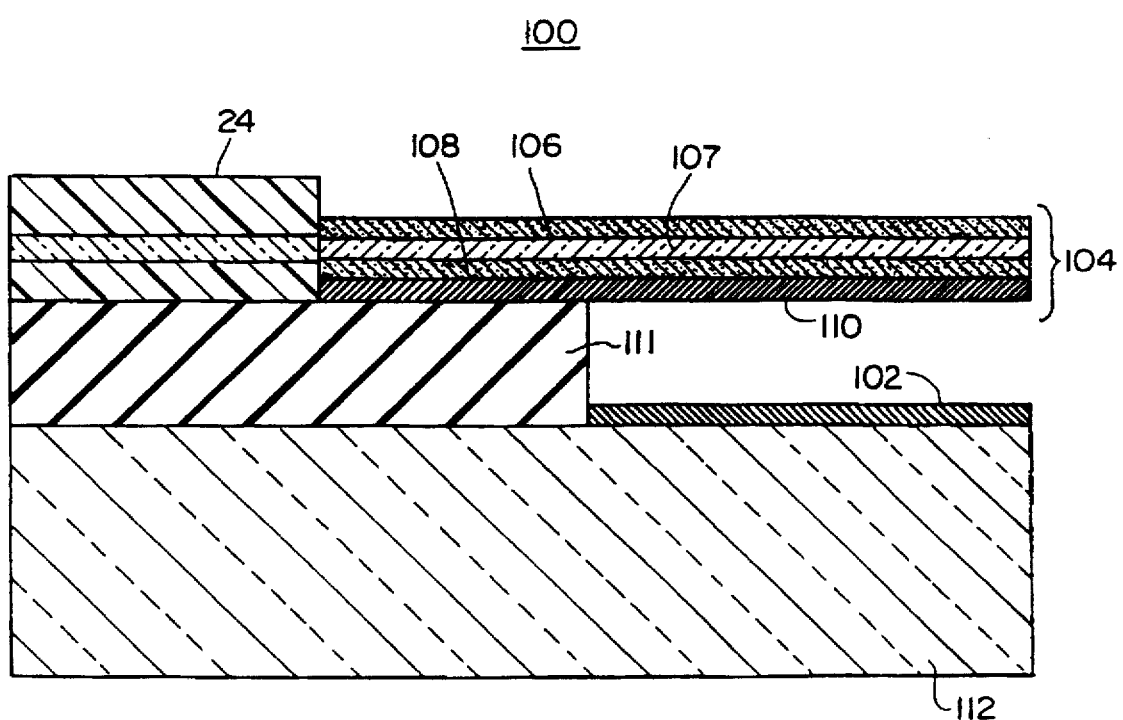
FIG. 12 is a side view of another embodiment of the beam steering means shown in FIG. 5 in accordance with this invention.

Another micromachined cantilever beam steering means is shown in FIG. 12, in the form of a cantilever waveguide. Typical waveguide cladding materials include materials of low index of refraction for the cladding region, such as silicon nitride, silicon oxynitride, glass, fused silica, oxide semiconductors, and related materials having index of refraction in the range of 1.4 to 2.0 or alternatively, free space with an index of 1. Typical waveguide core materials include silicon nitride, fused silica, silicon oxynitride, glass, oxide semiconductors, diamond, and other materials with index of refraction in the range of 1.5 to 4.0. The central requirement of a low loss waveguide is that the index of refraction of the cladding layer be less than the index of refraction of the waveguide layer. Combinations such as silicon dioxide and silicon oxynitride, or silicon oxynitride and diamond are examples of material combinations that will yield low loss waveguides. These combinations may also be selected for particular mechanical properties that yield the desired resonant frequency.

Electrostatically deflected cantilever waveguide beam scanner 100 is joined to optical fiber 24 as shown in FIG. 12. The optical fiber 24 is precisely located in alignment with waveguide core 107 by the V-groove method shown in FIG. 10. Electrostatically deflected cantilever waveguide device 100 includes metal plate 102 below cantilever portion 104 which comprises a waveguide core 107 surrounded by upper 106 and lower 108 cladding layers as shown. Metal plate 110 is associated with cantilever 104 as shown and separated from metal plate 102 by insulating structure 111. A capacitor is thus formed, one plate of which is metal plate 110 and the second plate 102 of which is spaced from metal plate 110 by insulating structure 111. By charging the capacitor, an attractive electrostatic force is created and by oscillating this charge, driving forces imparted to the cantilever portion 104 excite motion. Typical metals that may be used in this application include aluminum, nickel, chromium, copper, silver and gold. Alternatively plate 102 may be formed by the substrate 112 itself, and both plates 110 and 102 may be formed from conductive silicon. The typical thicknesses of metal plates and dielectric layers are in the range of 0.1 to 10 micrometers.

Figure 13:
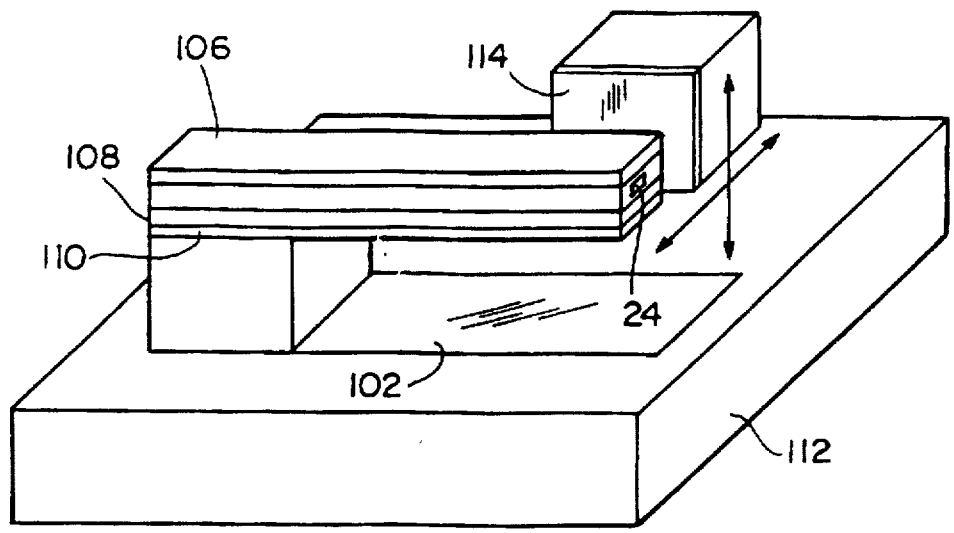
FIG. 13 is a schematic view of another embodiment of a beam steering means shown in FIG. 5 for dual axis scanning.

To provide deflection along two axes, an additional metal plate 114, FIG. 13 is provided to the side of cantilever portion 104 thereby permitting excitation in a lateral deflection mode which may have a different resonant frequency in order to achieve two axis scanning. In an alternative magnetically driven cantilever wave guide embodiment, metal plates 110 and 102, FIG. 12 are replaced with one plate (e.g. 110) of a magnetic material and the other plate (e.g. 102) of electromagnetic material. Note that these improvements over the use of an optical fiber or rod (U.S. Pat. No. 3,470,320) make possible the independent tailoring of the mechanical properties of the cantilever 104 in two axes. As an alternative embodiment, waveguide 100 may be used to provide scanning in one axis and a mirror (e.g. mirror 76, FIG. 6) may be used to provide scanning in the other direction.

Figure 14:
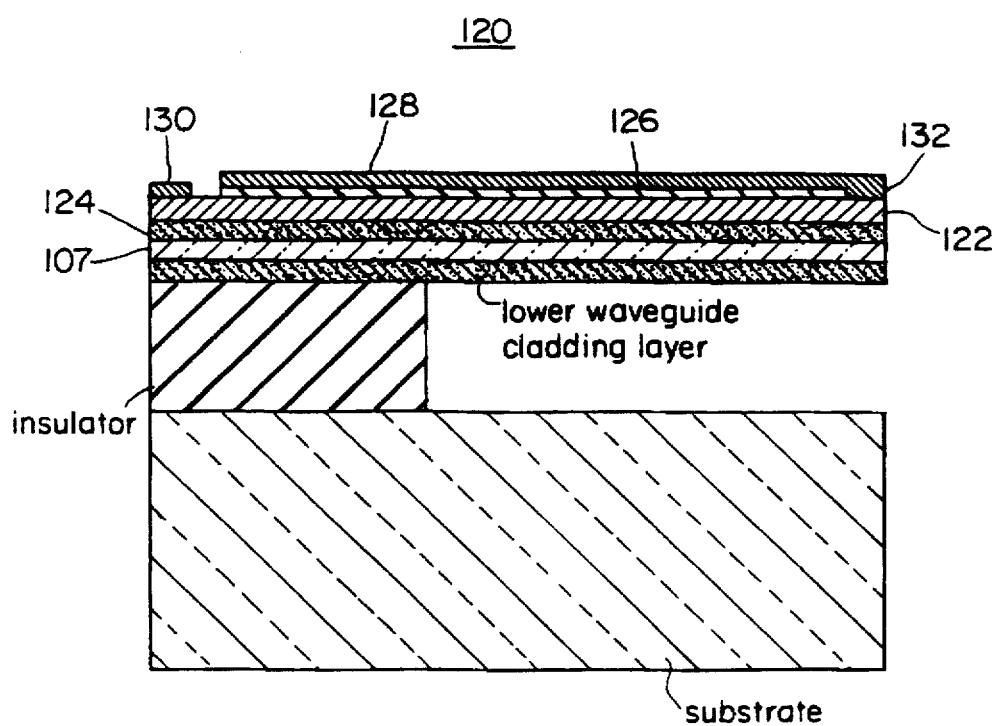
FIG. 14 is a side view of another embodiment of the beam steering means of the subject invention.

To provide a piezoelectric cantilever waveguide device, 120, FIG. 14, piezoelectric material 122 is placed on top of upper cladding layer 124 surrounding waveguide core 107. Insulator layer 126 separates contact pad 128 and contact pad 130. Contact pad 128 is in electrical contact with piezoelectric material layer 122 through contact via 132 as shown. By applying an electric potential between contacts 128 and 130, a bending motion results in piezoelectric material layer 122 thus deflecting waveguide 107. This bending motion can be used either to attain a static deflection of the cantilever 104 to a desired angle or to excite resonant or nonresonant motion of the cantilever.

Figure 15:
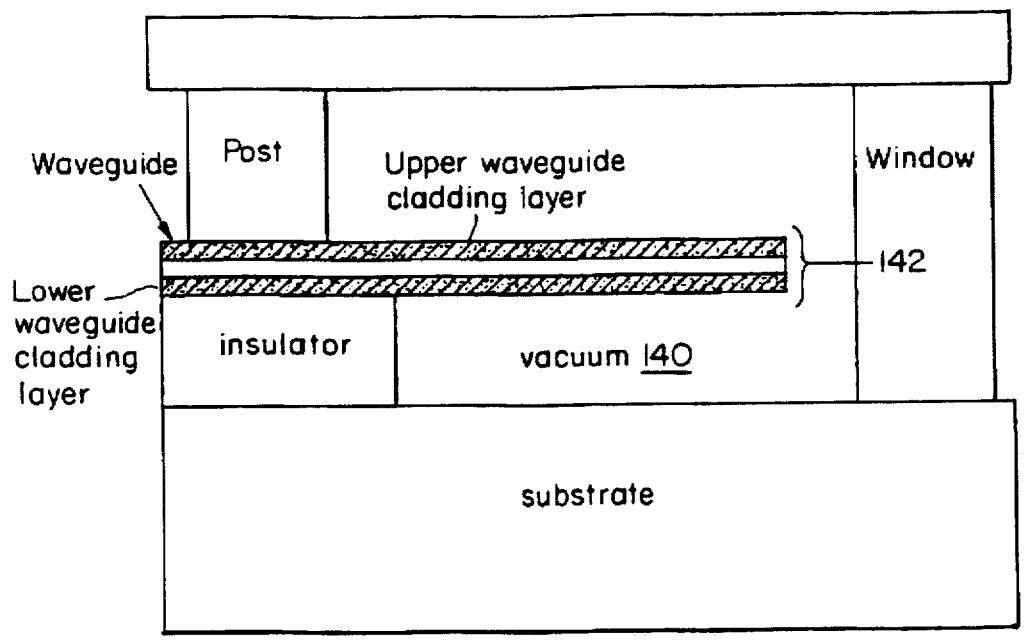
FIG. 15 is a side view of a vacuum enclosure for the beam steering means of the subject invention.
Figure 18:
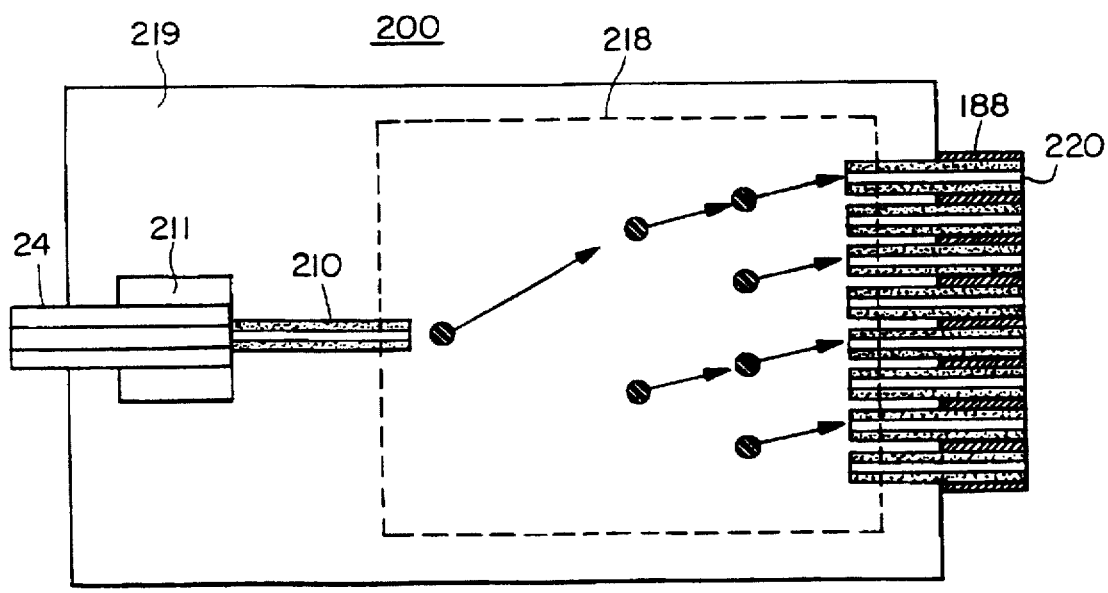
FIG. 18 is a schematic view of the switching circuit used in conjunction with the beam steering means shown in FIG. 17.

Any or all of the cantilever waveguides shown in FIGS. 7–14 may be placed within a vacuum cavity 140, FIG. 15 to reduce viscous damping of the motion or to dampen resonant motion of the cantilever portion 142 by adjusting the amount of residual gas within vacuum chamber 140. To amplify the displacement of the light 150 exiting optical fiber 24, FIG. 16, amplifier 160 is used which includes fixed mirror 162 and a set of discrete mirrors 164, 166, and 168. The angle of light ray 150 exciting amplifier 160 as shown at 170 is equal to the sum of the angular displacements of the discrete mirrors 164, 166, and 168. Any number of discrete mirrors may be used to obtain the desired deflection of beam 150. Substrate 171 may comprise glass and mirror 162 may be placed on the back side of the glass, as shown by position 172. In such a case the position of optical fiber 24 must be moved to the correct point in the optical path.

A single waveguide moving cantilever switch is described by Watts et al. "Electromechanical Optical Switching and Modulation in Micromachined Silicon-on-Insulator Waveguides", IEE International SOI Conference Proceedings, Vail Valley, Colo., Oct. 1–3 1991, pp. 62–63). In the Watts' device, a small deflection of a cantilever waveguide is obtained by applying several volts to obtain a deflection of several microns, thus introducing a misalignment between a fixed waveguide and a moving waveguide to cause a switching or modulation effect. The subject invention is an improvement over Watts, owing to the realization that larger cantilever displacements can be attained by altering the material structure and cantilever design to obtain a scanning waveguide device. This principal limitation of Watts' disclosure, i.e. the limited range of motion is overcome by increasing the length of the cantilever, by modifying the materials, and by using bulk micromachining rather than surface micromachining. A further limitation of Watts is the use of silicon for the waveguide core which is useful for switching of infrared wavelengths, but not useful for visible wavelengths.

A cantilever waveguide improved over Watts and useful for head mounted display applications can be formed according to the subject invention by using alternative materials, and by using a design intended for scanning application, as has been described above. For example, for scanned display applications, the core material of choice is silicon oxynitride rather than silicon, since silicon will not transmit sufficient visible light. Additionally, other alternative materials such as diamond permit the optimization of the mechanical properties of the cantilever as well as the optical properties. In the preferred embodiment, the waveguide core is formed from silicon oxynitride and has a compact cross section of about 1 micrometer high by 3 micrometers wide, with a length of several millimeters, and provides tip displacements of about 200 micrometers. To permit tip displacements of this magnitude, the substrate beneath the cantilever must be removed. In such a design, the cantilever 104, FIG. 12, insulator post 111, and substrate 112 remaining beneath the post 111 must be mounted on a new substrate provided with an electrostatic deflection electrode to replace electrode 102.

In another embodiment, beam steering means 28, FIG. 5 is accomplished in output waveguide device 180, FIG. 17. A set of waveguides 182, 184, 186, etc. is formed on the surface of the cantilever so that deflection of end 188 of the cantilever provides scanning of a line of light rays propagating from the waveguides 182, 184, 186. End 188 of the cantilever is deflected electrostatically by providing an oscillating voltage V between the electrostatic deflection pad 190 and conducting plate 189 in accordance with the methods show in FIG. 12. The cantilever may be designed to oscillate at a resonant frequency, in particular it may be designed for 60 or 72 Hz oscillation. Alternatively, the cantilever can be designed for a high resonant frequency and can be operated below resonance to obtain control of the cantilever position in the range of 0 to 72 Hz.

As an example, consider the design of 1024×768 display. To form the scanner using this waveguide approach, the cantilever must contain 1024 parallel waveguides, with each guide terminating at the end of the cantilever 188. The motion of the cantilever creates the equivalent of a vertical scan at for example 60 Hz (corresponding to a 60 Hz frame rate). The optical signal may be conveyed to the cantilever by the methods of U.S. Pat. Nos. 4,311,999 and 5,416,876 in the form of a raster line or by the methods of the subject invention.

A principal feature of the subject invention is the handling of the signal in optical form, without conversion to electrical signals. This makes possible the use of the signal itself for illumination, provided the signal is formed by appropriate visible wavelengths. A second feature of the subject invention is the integration of signal processing with beam steering to process and scan the signal illumination. The processing of the signal may be separated from the beam scanning method, or it may be integrated, as will be described.

The use of an optical signal processor within the head-mounted display and integrated with the beam scanner makes possible signal conditioning within the head mounted display. The signal processing that is possible includes but is not limited to demultiplexing of optical signals, distortion and aberration correction, scan detection, and brightness control.

Demultiplexing and/or remultiplexing of the optical signal is possible by construction of an optical switching matrix. A switching matrix based on a tree architecture applied to switching of infrared wavelengths was recently disclosed by Schienle et al. ("A 1×8 InP/InGaAsP Optical Matrix Switch with Low Insertion Loss and High Crosstalk Suppression," Journal of Lightwave Technology Vol. 14., No. 5, May 1996 pp. 882–826). The tree architecture makes possible the routing of a signal source (from, for example, an optical fiber) to one or more output channels. Schienle et al. disclose an active compound semiconductor device. A visible wavelength switching matrix can be constructed in a similar manner, or can be constructed using micro-opto-electromechanical technology described infra. The utility of a switching matrix in a miniature display application results from the realization that the free-space horizontal scan obtained by moving mirrors or waveguides can be replaced by a waveguide alternative, in the manner of Schienel. In such an approach, a plurality of fixed waveguides is formed on a cantilever (FIG. 17). The vertical motion of the cantilever 188 provides a free space vertical scan. The cantilever is energized by the electrostatic, piezoelectric, or magnetic means discussed previously. The horizontal scan is obtained within a waveguide circuit by passing the light from the optical fiber 24 to an entrance waveguide 210 and then through a tree architecture switching matrix 218 represented in a simplified schematic form in FIG. 18. The matrix is switched synchronously with respect to the modulator (FIG. 5) so that the optical signal exits the cantilever 188 through the appropriate waveguide 220. Such a matrix 218 makes possible the replacement of the horizontal scanning mirror or waveguide with an array of waveguides and switches, so that the horizontal pixel positioning is obtained by routing the optical signal from an optical fiber 24, located precisely in V-grove 211 with respect to stationary waveguide 210, through the waveguide 210, and subsequently through the tree switching matrix 218, and finally through the desired output waveguide channel. An image plane is thus formed over the area subtended by the moving cantilever end surface. The resulting image can be relayed by free space optics to the viewer's eyes.

Figure 19:
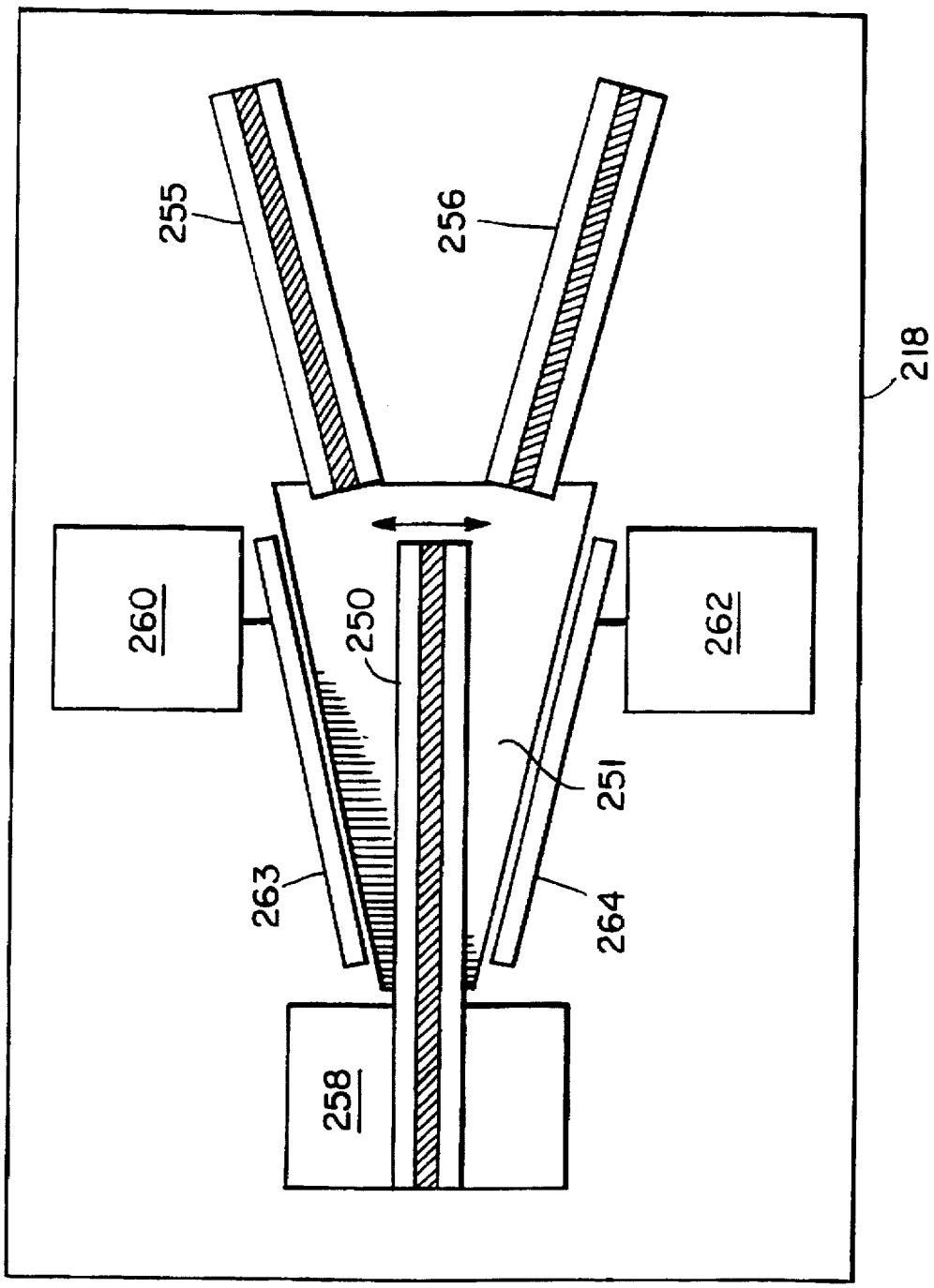
FIG. 19 is a top plan view of the optical switching means shown in FIG. 18.

Switching matrix 218 can be attained by using active semiconductor devices, or by the using optical micro-electro mechanical elements such as cantilevers, mirrors, or lenses arrayed in a switching matrix. In one embodiment shown in plan view in FIG. 13, and cantilever waveguide of the type described in FIG. 13 is formed in a cavity 251 in proximity to two or more stationary waveguides, 255, 256, all of which are formed on substrate 218. Contact pad 258 is in contact with a metal electrode 110, FIG. 13, and contact pads 260 and 262 are in contact with electrodes 263 and 264, respectively. By applying an electric potential between pad 258 and pad 260, a field is created between electrode 263 (in electrical contact with pad 260) and the static electrode on the cantilever 110, FIG. 13 and by this force the cantilever 250 may be moved by electrostatic attraction into a position of optical alignment with stationary waveguide 255. In this position, light will propagate from waveguide 250 to waveguide 255. Alternatively, if an electric potential is applied between pad 258 and pad 262, the cantilever 250 will be attracted by electrostatic force to a position of optical alignment with stationary waveguide 256. Note that the displacement of the cantilever tip need not be greater than about 5 micrometers to affect switching action. In this way, an optical switch may be formed. Although straight side walls of the cavity 251, and straight electrodes 263,264 are shown in FIG. 19 for clarity, these features may be designed with a curvature approximating that of the displaced cantilever so as to minimize the space between the deflected cantilever and the stationary electrode, (263 or 264) and in this way reduce the required switching voltage. Other features that may be incorporated within the switch include lenses, mirrors, and other micro-optical components, which may be used to minimize optical losses within the switch. Switches may be interconnected on one monolithic substrate 219 by using stationary waveguides to join optically the individual waveguides to form a switching network 218. In such a case, pads 260 and 262 may be replaced by metal interconnects as is common in the interconnection of integrated circuits. The control circuitry for the optical switches can be formed by interconnecting the electrodes with contact pads located at the edge of the substrate 218, or alternatively, the control circuitry can be formed by integrated circuit techniques used to form transistors and interconnect in the substrate material itself.

By cascading optical switches, a tree architecture switching matrix can be created to form a waveguide-based horizontal scan. Any number of such tree switches may be combined to integrate the signals from a plurality of fiber optic cables 24 that may be used to transmit the optical signals in parallel.

For visible wavelengths (0.4 µm to 0.65 µm), output waveguides 182, 184, 186 . . . (FIG. 17) comprise core regions of silicon oxynitride or diamond with a silicon dioxide cladding layers. Conductive layer 189 is formed by silicon or alternatively of a metal such as aluminum, isolated from the substrate by a layer of silicon dioxide 111 beneath it.

In this embodiment horizontal scanning is accomplished by the optical processor 200 (FIG. 18) and optical switching is accomplished by switching network 218. Using this network, a single optical fiber 24 coupled to input waveguide 210, feeds the pixel illumination to network 218 which then selects the one waveguide in the output set through which the light from a given fiber will be piped onto output waveguide 220, so that in a given time slice, one or more pixels are illuminated with the correct color and brightness. This process is repeated sequentially for each pixel in the line. The horizontal scanning process comprises the setting of the correct switch positions, followed by the piping of the correct color and intensity of light to the particular final waveguide pixel. Note that although the switching signal is supplied either electrically or optically, it is a repetitive signal of low speed, and thus relatively easy to convey to the head electrically, or alternatively, to generate in a simple circuit within the substrate 219. In contrast, it is the pixel grey level data which, being arbitrary or random in nature is supplied at high speed optically to the optical processor.

The speed which cantilever 250, FIG. 19, must respond is specified by the display resolution, frame rate, and number of parallel data lines. The frame time for a 60 Hz frame rate is 16.7 ms. For 768 lines displayed in 16.7 ms, the linescan time is 21.7 µs. Since, for a single data line, the switching network must accommodate illumination of one pixel at a time, and since 1024 pixels must be addressed in 21.7 µs, the pixel illumination time is then 21 ns. If the data is fed in parallel over multiple optical fibers, then the number of pixels served by the data line is reduced, and the illumination times are increased accordingly. Table 3 summarizes the switching times and cantilever velocities needed for various dam line multiplexing for the 640×480 case and the 1024× 768 case. The switching time is assumed to be 10% of the pixel illumination time. The speed is determined by considering that the stationary (output) waveguide pitch may be as slow as 3 µm.

TABLE 3

ROTOR SWITCHING SPEED REQUIREMENTS

| Format | Number of Data line | Pixel Illumination (ns) | Switching Time (ns) | Rotor Tip Velocity (m/s) |
|---|---|---|---|---|
| 1024 × 768 (SVGA) | 1 | 21 | 2.1 | 1400 |
|  | 5 | 105 | 10 | 300 |
|  | 10 | 210 | 21 | 142 |
|  | 40 | 840 | 84 | 35 |
| 640 × 480 (VGA) | 1 | 54 | 5.4 | 556 |
|  | 5 | 270 | 27 | 111 |
|  | 10 | 540 | 54 | 56 |
|  | 40 | 2160 | 216 | 14 |

Table 3 indicates that for a single data line in a 1024×768 display, the tip would be moving at a supersonic rate. Therefore, it is most likely that the cantilever based optical switch must be placed within a vacuum (see FIG. 15). However, for a VGA display with 10 parallel input lines, the tip speed is a manageable 56 m/s.

Other signal processing that may be accomplished within the device includes brightness control and distortion or aberration correction. Brightness control may be accomplished by passing the optical signal through a waveguide attenuator, or preferably through a micromachined cantilever waveguide attenuator. Aberration control can be attained by passing the optical signals through an additional set of deflection mirrors. The motion of these mirrors is arranged so as to redistribute the image in accordance with known optical distortion. Such correction may also be attained by modifying the scan timing of the principal scanning means.

The optical signal processing circuit may also include edge detection sensors that determine when the scanned beam is at its extreme limits. The signal from this sensor can be used to synchronize system timing and to form a safety device for eye protection as previously described.

Figure 20:
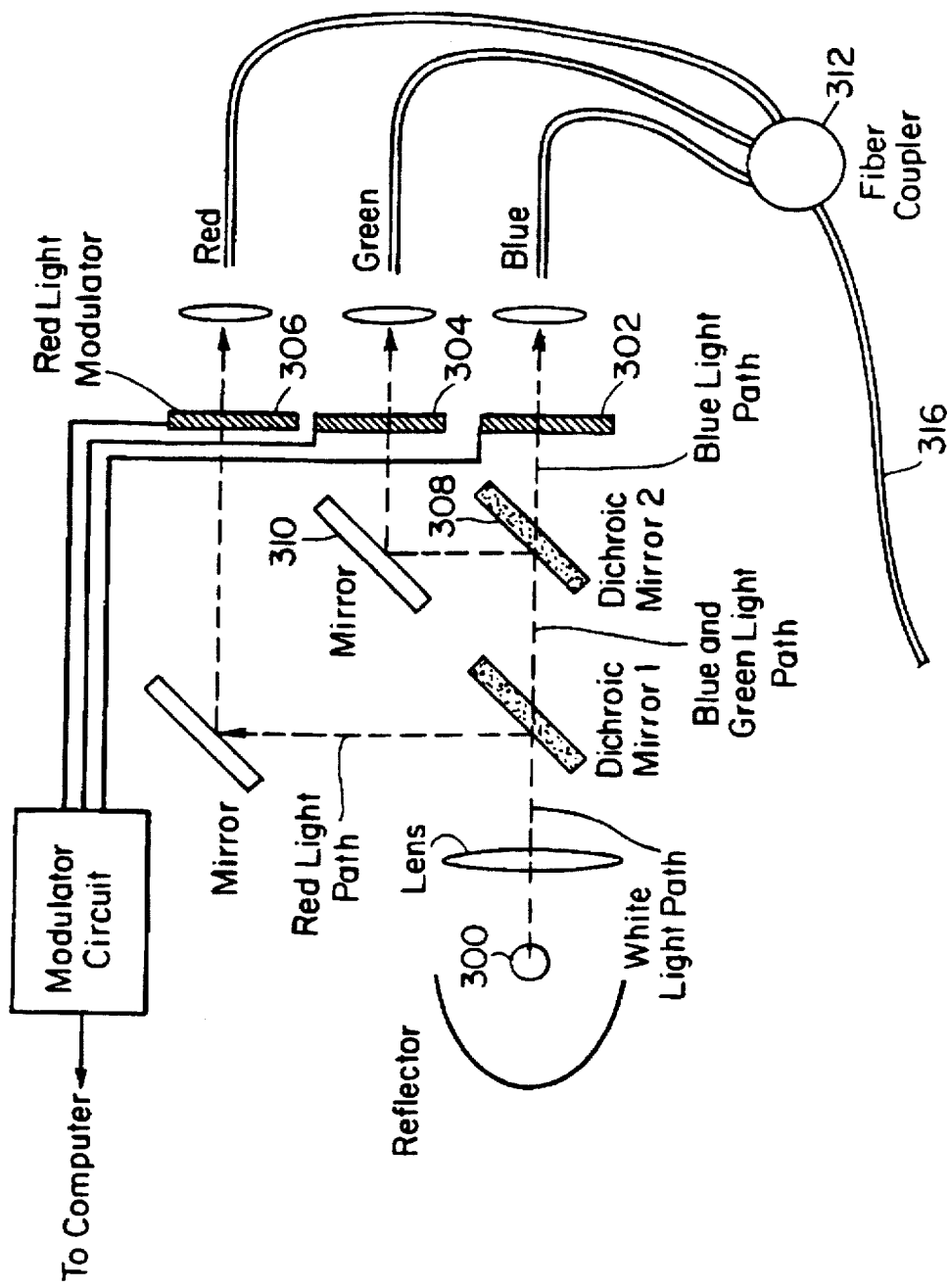
FIG. 20 is a block diagram of a color optical signal generating means in accordance with this invention.

For the case of a color display, the three component colors (red, greed and blue) must be separately modulated and then combined, as shown in FIG. 20. Accordingly, white light is delivered from source 300 to the modulators 302, 304 and 306 using dichroic mirrors 308, end 310. The light from modulators 302, 304 and 306 is combined using fiber optic coupler 312, and is then delivered to the beam steering means by optical fiber 316. Alternatively, the colors may be combined by free space optics and then the combination delivered to a fiber. For designs in which the distances are short (<10 cm) free space optics may be used. For longer distances, an optical fiber is the preferred method of delivering the light to the scanners. Other methods of generating red, green and blue include the use of LED's and lasers, the output of which may be combined through free space optics or a fiber coupler.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A compact display system comprising:

a viewing surface;

an optical signal processor including beam steering means;

a source of light remote from the viewing surface and the beam steering means;

at least one waveguide connecting said source of light with said viewing surface for transmitting illumination from the source of light to the viewing surface;

said beam steering means associated with the waveguide and the viewing surface for scanning illumination transmitted by the waveguide in two directions onto the viewing surface;

a modulator for modulating said source of light; and means for synchronizing the modulator with the beam steering means.

2. The system of claim 1 further including a pair of eyeglasses, said beam steering means mounted on said eyeglasses and connected to one end of said waveguide, the viewing surface including said eyeglasses, the source of light and the modulator remote from the eyeglasses.

3. The system of claim 2 further including means for sensing the range of scanning by the beam steering means.

4. The system of claim 3 further including means, responsive to the means for sensing, and responsive to the modulator, for interrupting the transmission of light to the beam steering means in response to a range of scanning beyond a predetermined threshold to protect the eyeglass wearer's eyes.

5. The system of claim 1 in which said beam steering means includes a pair of reflective elements positioned to receive light from said waveguide, means for deflecting one of said reflective elements in one direction, and means for deflecting the other reflective element in a second direction.

6. The system of claim 1 in which said waveguide is an optical fiber.

7. The system of claim 6 in which said beam steering means includes a cantilever portion.

8. The system of claim 7 in which said beam steering means includes a substrate and a groove cut in the substrate to receive said optical fiber.

9. The system of claim 8 in which said groove includes two portions, a first portion of a first depth to fix the position of the fiber and a second, cantilever portion of a second, greater depth in which the distal end of the fiber is free to move.

10. The system of claim 7 in which said beam steering means includes a capacitor, one plate of which is a component of the cantilever portion and a second plate of which is spaced from the first plate in one direction for deflecting said cantilever in said one direction.

11. The system of claim 10 further including a second capacitor having a third plate spaced from the first plate in a second direction for deflecting said cantilever in said second direction.

12. The system of claim 7 in which said cantilever portion includes a layer of piezoelectric material and means for applying a potential across the piezoelectric material.

13. The system of claim 7 in which said cantilever portion includes one of a material attracted to magnetic forces and an electromagnetic material, the other of the material attracted to magnetic forces and the electromagnetic material spaced therefrom.

14. The system of claim 1 further including a vacuum enclosure surrounding said beam steering means for controlling the of damping the motion of the beam steering means.

15. The system of claim 1 further including means for amplifying the displacement of light exiting said waveguide.

16. The system of claim 15 in which said means for amplifying includes a set of reflectors displaced at an angle with respect to a path of light exiting the distal end of the waveguide.

17. The system of claim 1 in which said beam steering means includes a plurality of parallel output waveguides on a deflectable cantilever pad.

18. The system of claim 17 in which said at least one waveguide includes an optical fiber.

19. The system of claim 18 further including means for switching the position of a distal end of said fiber to direct illumination alternately among said output waveguides.

20. The system of claim 1 in which said source of light is a source of white light, the system further including means for resolving said white light into a plurality of colors.

21. The system of claim 20 in which said means for resolving includes dichroic devices, one for each color.

22. The system of claim 20 in which said modulator includes means for separately modulating each color of light.

23. The system of claim 22 in which said waveguide includes a plurality of input optical fibers each optically coupled to each means for modulating and a fiber coupler for coupling each to said input fiber.

24. The system of claim 23 further including an output optical fiber connected to said coupler.

25. The system of claim 1 in which said source of light includes at least one semiconductor light-emitting device.

26. The system of claim 6 in which said optical fiber is a single mode fiber with a core diameter in the range of approximately 1 µm to 5 µm.

27. The system of claim 6 in which said optical fiber has a length greater than three feet for increasing the maneuverability of said viewing surface.

28. A compact display system comprising:

a viewing surface;

a waveguide;

an optical signal processor including beam steering means comprising:

a pair of reflective elements positioned to receive light from said waveguide, means for deflecting one of said reflective elements in one direction, and means for deflecting the other reflective element in a second direction;

a source of light remote from the viewing surface;

the waveguide connecting said source of light with said beam steering means for transmitting illumination from the source of light to the beam steering means;

a modulator for modulating said source of light; and means for synchronizing the modulator with said means for deflecting.

29. A compact display system comprising:

a viewing surface;

a long, flexible optical fiber;

beam steering means including a cantilever portion for scanning illumination transmitted by said optical fiber in two directions;

a source of light remote from the viewing surface;

a modulator for modulating said source of light; and means for synchronizing the modulator with the beam steering means.

30. The system of claim 29 in which said beam steering means includes a substrate and a groove cut in the substrate to receive said optical fiber.

31. The system of claim 30 in which said groove includes two portions, a first portion of a first depth to fix the position of the fiber and a second portion of a second, greater depth in which the distal end of the fiber is free to move.

32. A compact display system comprising:

a viewing surface;

a long, flexible, optic fiber;

beam steering means including a cantilever portion and a capacitor, one plate of which is a component of the cantilever portion and a second plate of which is spaced from the first plate in one direction for deflecting a distal end of said fiber in said one direction;

a source of light remote from the viewing surface;

a modulator for modulating said source of light; and means for synchronizing the modulator with the beam steering means.

33. A compact display system comprising:

a viewing surface;

a long, flexible optical fiber;

beam steering means comprising a cantilever portion including a distal end of said optical fiber, and a layer of piezoelectric material and means for applying a potential across the piezoelectric material;

a source of light remote from the viewing surface;

a modulator for modulating said source of light; and means for synchronizing the modulator with the beam steering means.

34. A compact display system comprising:

a viewing surface;

a source of light remote from the viewing surface;

a long, flexible optic fiber connecting said source of light with said viewing surface for transmitting illumination from the source of light to the viewing surface;

beam steering means comprising a cantilever portion including a distal end of said optical fiber, said cantilever portion including one of a material attracted to magnetic forces and an electromagnetic material, the other of the material attracted to magnetic forces and the electromagnetic material spaced therefrom;

a modulator for modulating said source of light; and means for synchronizing the modulator with the beam steering means.

35. A compact display system comprising:

a viewing surface;

beam steering means including a plurality of parallel output waveguides on a deflectable cantilever pad;

a source of light remote from the viewing surface;

a long, flexible, optical fiber connecting said source of light with said beam steering means;

said beam steering means associated with a distal end of the optical fiber and the viewing surface for scanning illumination transmitted by the optical fiber onto the viewing surface;

a modulator for modulating said source of light; and means for synchronizing the modulator with the beam steering means.

36. The system of claim 35 further including means for switching the position of the photons from said fiber to direct illumination alternately among said output waveguides.

37. A compact display system comprising:

a viewing surface;

beam steering means;

a source of white light;

means for resolving said white light into a plurality of colors;

at least one waveguide connecting said source of light with said viewing surface for transmitting illumination from the source of light to the viewing surface;

said beam steering means associated with the waveguide and the viewing surface for scanning illumination transmitted by the waveguide onto the viewing surface;

a modulator for including means for separately modulating each color of light; and means for synchronizing the modulator with the beam steering means.

* * * * *